United States Patent [19]

Borner et al.

[11] Patent Number: 4,741,211

[45] Date of Patent: May 3, 1988

[54] HEAVY WHEEL BALANCER

[76] Inventors: Willy Borner, 21096 Grenola Dr., Cupertino, Calif. 95014; Bernie F. Jackson, 23485 Summit Rd., Los Gatos, Calif. 95030

[21] Appl. No.: 928,576

[22] Filed: Nov. 13, 1986

Related U.S. Application Data

[63] Continuation of Ser. No. 689,947, Jan. 9, 1985, abandoned, which is a continuation-in-part of Ser. No. 571,832, Jan. 19, 1984, abandoned.

[51] Int. Cl.⁴ ............................................. G01M 1/02
[52] U.S. Cl. ......................................... 73/462; 73/476
[58] Field of Search ................. 73/459, 460, 462, 473, 73/475, 476, 477, 478, 479, 480, 487

[56] References Cited

U.S. PATENT DOCUMENTS

| | | | |
|---|---|---|---|
| 2,322,939 | 6/1943 | Inman | 73/473 |
| 2,752,788 | 7/1956 | La Penta | 73/487 |
| 3,289,483 | 12/1966 | Slemmons | 73/459 |
| 3,824,862 | 7/1974 | Branick | 73/480 |
| 4,238,961 | 12/1980 | Johnson | 73/487 |
| 4,423,632 | 1/1984 | Madden et al. | 73/462 |
| 4,489,607 | 12/1984 | Park | 73/476 |

*Primary Examiner*—John Chapman
*Attorney, Agent, or Firm*—Ciotti & Murashige, Irell & Manella

[57] ABSTRACT

A machine and method for conveniently dynamically balancing heavy rotational members such as large vehicle wheels is disclosed. The machine employs a horizontal rotatable shaft that is movable vertically so as to align and engage the center of the member as it stands vertically in the ground. Thereafter the shaft is raised vertically until the member clears the ground and is rotatable for balancing. In preferred embodiments the balancing mechanism is manually powered and detachable from the machine's base for transport and the base is constructed with its vertical member angled so as to preload and stress the base by the weight of the member and eliminate play in the base. The machine offers portability and transport advantages.

13 Claims, 4 Drawing Sheets

HEAVY WHEEL BALANCER

This application is a continuation, of application Ser. No. 689,947, filed Jan. 9, 1985 which is a continuation-in-part of Ser. No. 571,832 filed Jan. 9, 1984 and both now abandoned.

BACKGROUND OF THE INVENTION

The present invention relates to methods and apparatus for determining the imbalance of a rotational member, particularly a wheel, and more specifically to methods and apparatus that are capable of dynamically determining the imbalance of a rotational member. Although it is discussed hereinafter with particular reference to the balancing of wheels, it will be appreciated that aspects of this invention are applicable to other types of rotational members, e.g., rotors or the like. It will be appreciated that when this application refers to balancing "wheels" what is actually being balanced is usually a wheel-tire combination, and that "wheel" includes this combination.

At present, there are available two basic types of systems for determining the imbalance of a wheel having a tire mounted thereon. One of these types of systems is a static one, in which the wheel and tire remain motionless while any imbalance thereof is determined. For example, the wheel can be supported in a horizontal orientation by means of a leveling type of support device having a bubble or similar such indicator that is shifted from a central reference point in dependence upon the imbalance of the tire. By placing suitable weights at strategic points around the rim of the wheel, an operator is able to vary the position of the bubble indicator until it is brought to the reference point. Thereafter, the weights are fixed to the wheel at these strategic points.

The second basic type of wheel balancing system, a dynamic balancing system, has been developed to provide a more complete indication of the imbalance of a wheel and the manner in which it can be corrected. In dynamic wheel balancing systems, the wheel to be balanced is mounted on a shaft that is brought up to a predetermined rotational speed. Once the wheel attains this required speed, measurements are made of the lateral movement of the shaft, or the forces generated by the shaft, due to the imbalance of the wheel. From these measurements, indications of the magnitude of the imbalance of the wheel and the location of the imbalance can be made. While a dynamic balancing system can determine the location of imbalance in a single plane, with this method counterbalancing centrifugal forces present on two planes, generally the inner and outer planes of the wheel, can be detected, distinguished and corrected. Thus, a more precise correction of imbalance is attained. Thereafter the wheel is demounted from the balancer.

Typically, the rotational speed of the wheel is held constant at 400 rpm or greater during dynamic imbalance measurement. Such a speed has been used for several reasons. For one, it is easier to measure the forces of imbalance at high speed as the magnitude of the imbalance forces increases as the square of rotational velocity. At high velocities very favorable signal/noise ratios are easily obtained. For another, there was a generally held but erroneous belief that wheels needed to be balanced at rotational velocities approximating road speed.

U.S. Pat. No. 4,435,982 of Borner and Jackson discloses an improvement in dynamic balancers wherein the rotational velocity of measurement is reduced to less than 360 rpm and the imbalance measurement is carried out with the wheel drive system disconnected and the wheel in a "coasting" mode.

U.S. Pat. No. 4,507,964 of Borner and Jackson describes a further improvement in which the required rotational velocity is further reduced to 100 rpm or even lower and the wheel is rotated manually and permitted to coast. The just noted Borner-Jackson patents are incorporated herein by reference.

Machines embodying the Borner-Jackson patents are being marketed to the trade under the trademarks Balco 80 and Balco 90 respectively. The Balco 80 and Balco 90 balancers are characterized by carrying out their imbalance measurement when the rotational speed has coasted down to equal any one of one or several predetermined measuring velocities. The Balco 90 machine performs its function particularly well in this regard. However, at times with unexperienced operators, the wheel will be hand spun substantially in excess of the required preset measuring velocity and a time-consuming wait for the wheel to slow to that velocity is incurred.

The Balco machines, and to our knowledge other dynamic balancers, have the characteristic that the carrier for the rotatable shaft upon which the wheel is mounted is fixedly attached to a base or pedestal. The wheel is manually lifted up onto the shaft and mounted so it will clear the floor and spin. This is a simple configuration that is quite convenient when the wheels to be balanced are motorcycle or light automobile wheels. However, when the wheels are large and heavy, i.e., large automobile wheels or truck wheels, the positioning and mounting becomes difficult and dangerous. A separate lifting device, such as a jack or fork lift is usually required with two persons often being needed to position the wheel and mount it. This greatly increases the time and costs involved in balancing these large heavy wheels.

Another problem which occurs when balancing large and heavy wheels is that the wheels are not easily portable and it would often be preferable to be able to move the balancer to the wheel rather than vice versa. The above-noted Balco 90 machine is portable but other balancing machines used heretofore are large pieces of equipment generally requiring permanent in-shop installation.

OBJECTS AND SUMMARY OF THE INVENTION

It is therefore a general object of the present invention to provide a novel method and apparatus for determining the imbalance of a wheel or the like that is capable of operating with the accuracy of other dynamic wheel balancers but without limitations that may be attributed to them.

It is another object of the present invention to provide a novel apparatus for dynamically determining imbalance of a wheel that does not require or employ a predetermined rotational velocity for carrying out imbalance measurements and therefore carries out the measurements in a substantially uniform time period.

It is yet another object of the present invention to provide a novel method and apparatus for dynamically determining the imbalance of a wheel in which the wheel can be mounted in a manner that substantially reduces the effort and safety hazards associated with mounting large wheels in prior operations.

It is a further object of the present invention to provide a novel apparatus for dynamically determining the imbalance of a wheel which is portable and mobile and adapted for in-the-field use.

In accordance with these and other objects, the present invention provides a novel wheel balancing system that does not employ a preset measuring velocity and thus is capable of determining the imbalance of a wheel at any velocity within a range of velocities. It has been found that this can be accomplished by a balancer which employs electronic measuring circuitry which includes a multiplying D/A converter that receives one or more output signals respectively provided by one or more force measuring transducers of the balancer, and presents them to a microprocessor. The microprocessor compares them to threshold levels, and sends a command signal to the converter to multiply the input signals by an amount which causes them to be within a reasonable range when they are presented to the microprocessor. Thus, regardless of whether the wheel to be balanced is rotating at a low velocity (causing relatively low amplitude input signals) or a high velocity (resulting in much greater amplitude input signals), they are capable of being processed within the microprocessor once they have been appropriately amplified to lie within its operating range.

It has further been discovered that this invention permits wheel balancing to be carried out at very low speeds by its upward adjustment of the small signals obtained at low speeds. This may advantageously be applied to the balancing of difficult and dangerous to mount large wheels such as truck wheels. The present invention additionally provides a novel system for dynamically balancing wheels which does not require the operator to manually lift the wheel onto the rotatable balancing shaft. This system includes a horizontal rotatable balancing shaft adapted to support the wheel to be balanced. This shaft is movable upwards and downwards relative to the balancer's base and to the ground, preferably the base itself is movable horizontally on the ground such as on wheels, rollers or skids. Thus, the balancer is a mobile unit that can be brought to a vertically standing wheel, and the balancing shaft is adjusted to a height to properly align with the center of the wheel. After affixing the wheel to the shaft, the shaft is raised until the wheel clears the ground. Then the wheel is spun, and its imbalance is determined. The wheel is then allowed to stop rotating. The wheel can be stopped by merely letting wind resistance and bearing friction slow it, the balancer can be equipped with a braking mechanism or preferably the spinning wheel is stopped by lowering it until it lightly contacts the ground, which contact will stop the wheel. Then the weights required to correct the imbalance are attached to the wheel. If the wheel had been lowered to brake its rotation, it will generally need to be raised to properly locate the correcting weights. Thereafter the shaft with the attached wheel is lowered until the wheel is again resting on the ground and the wheel is then disconnected from the balancing shaft and the balancer can be moved away from the wheel. In a preferred embodiment of the principles of this invention the upward-downward movement of the shaft relative to the base is somewhat oblique to the vertical plane passing through the horizontal balancing shaft. This geometry permits the gross weight of the wheel to preload or self lock the balancer's base with forces that exceed the maximum forces of imbalance that will be experienced in balancing. This causes the vibrations caused by the imbalanced rotating wheel to stay true and minimizes spurious motion and vibration not caused by wheel imbalance forces when the wheel is rotated.

This geometry and the preload it achieves enhance the portability of the device. The rotatable balancing shaft and its associated bearing support structure and electronics (i.e., the balancing head), which are relatively precise and sensitive in nature can be demountable from the relatively more rugged and heavy base so that the base can be transported without worries of damaging the balancing head which can itself be transported with better protection. The preload corrects for clearance and takes up the play between the balancing head assembly and the base, thereby permitting the clearances between these two units to be very generous resulting in an attendant ease of reassembly.

Although those aspects of this invention which relate to the use of non-preselected balancing speed work well in the balancing of heavy-large truck wheels and thus work with special advantage in combination with those aspects of this invention which relate to an adjustable position shaft, it will be appreciated that both of these aspects can be practiced separately as well. Thus, for example, the use of non-preselected balancing speed can be incorporated into balancers such as are described in Jackson and Borner U.S. Pat. No. 4,507,964 or the like. Likewise, the adjustable position shaft could be employed with other measurement circuitry.

The manner in which the present invention achieves the foregoing objects and their attendant advantages will be more fully appreciated upon a perusal of the following detailed description of preferred embodiments of the invention illustrated in the accompanying drawings.

DETAILED DESCRIPTION OF THE PREFERRED EMBODIMENT

Figure 1:
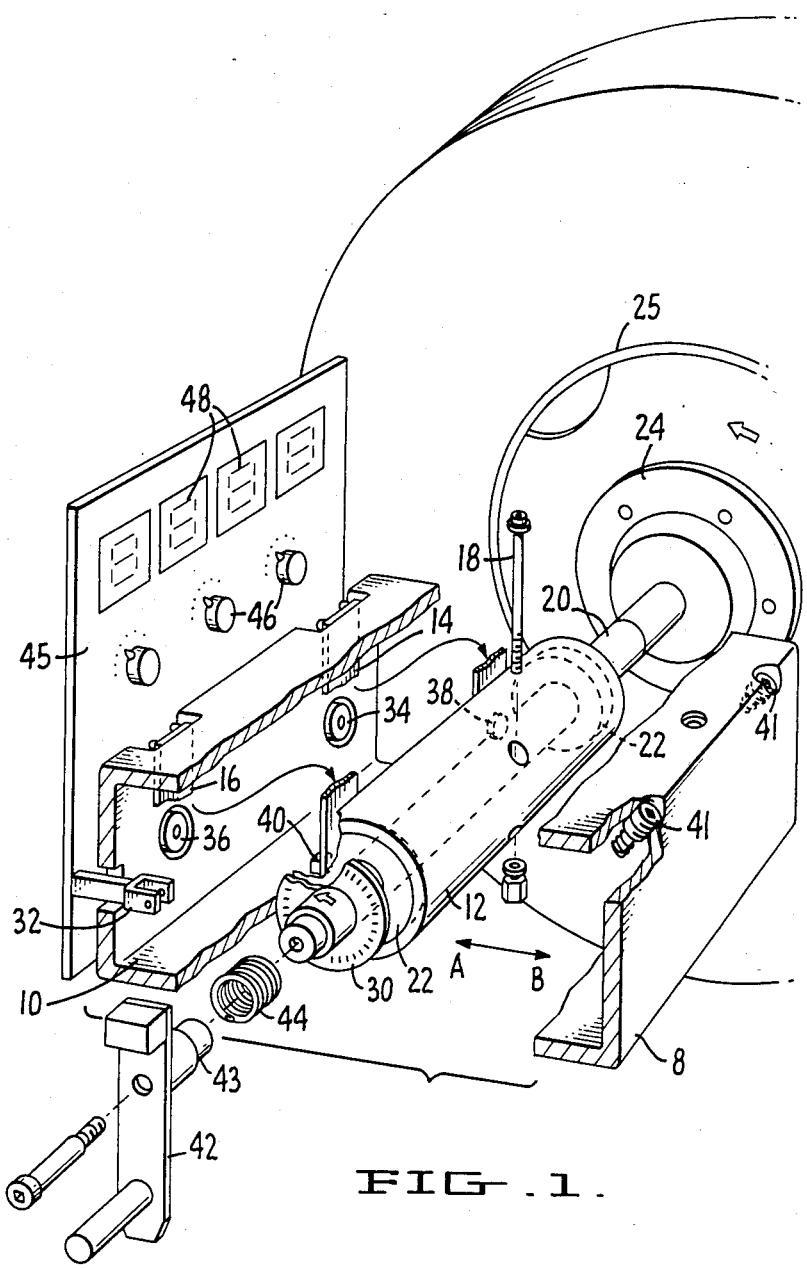
FIG. 1 is a perspective view of a typical balancing shaft and measuring head apparatus for generating electrical signals relating to imbalance forces.

Referring to FIG. 1 of the application, the wheel balancer head 8 illustrated therein includes a frame 10 that provides suitable structural support for all of the mechanical and electrical components of the balancer head. The frame 10 basically comprises an elongated tube having a generally square or rectangular cross section. A tubular housing 12 is suspended from the top wall of the frame 10 in a manner such that it can transmit forces in one direction only. The support mechanism for the housing 12 includes a pair of metal strips 14 and 16 that are sufficiently flexible to allow freedom of movement in one horizontal direction, i.e., in the direction indicated as A-B in FIG. 1. The metal strips are sufficiently rigid so as not to undergo elastic compression or stretching, and thereby inhibit movement of the housing 12 in a vertical direction. In addition, the strips 14 and 16 are rigidly attached to both the frame 10, and to the housing 12, so that they are not pivotable in a vertical plane, thereby inhibiting movement of the frame in a longitudinal direction, i.e., in a direction perpendicular to A-B. Additional support for the housing 12 is provided by a vertical rod 18 that is attached to the side of the housing opposite the strips 14 and 16 and that allows the necessary freedom of movement of the housing.

Figure 2:
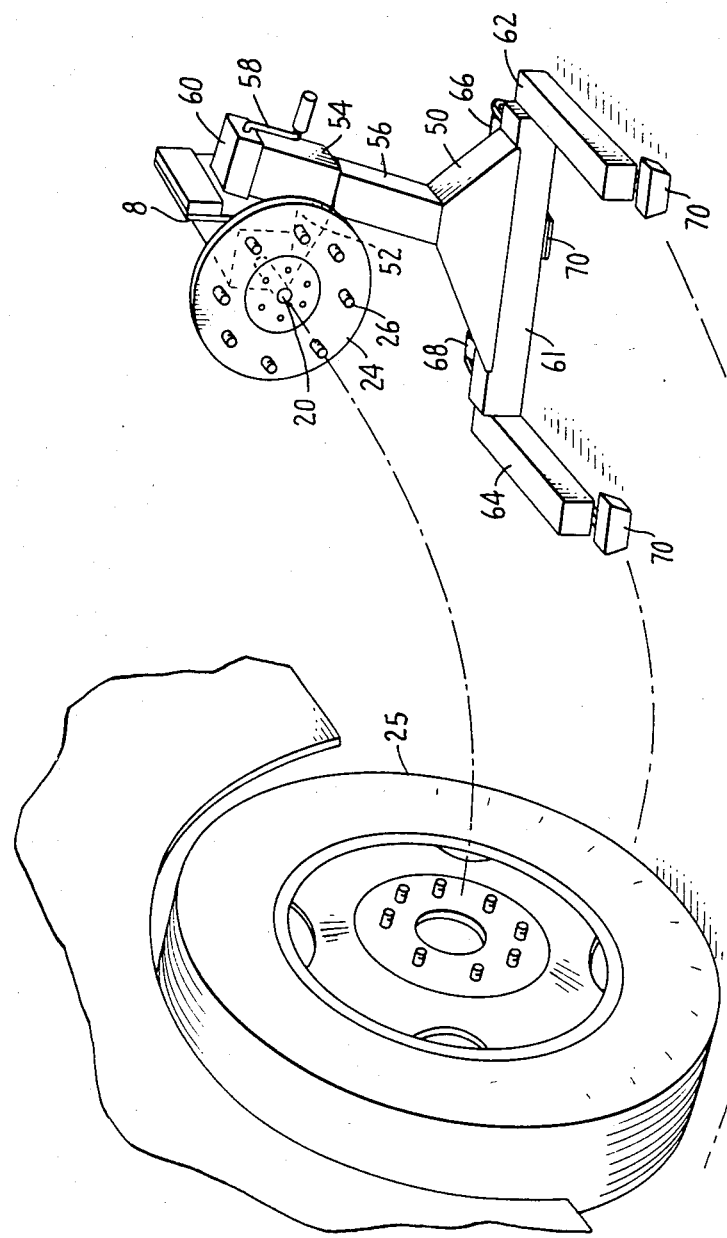
FIG. 2 is a perspective view of an adjustable position shaft wheel balancing apparatus constructed in accordance with the principles of the present invention and employing a balancing head apparatus such as shown in FIG. 1.
Figure 3:
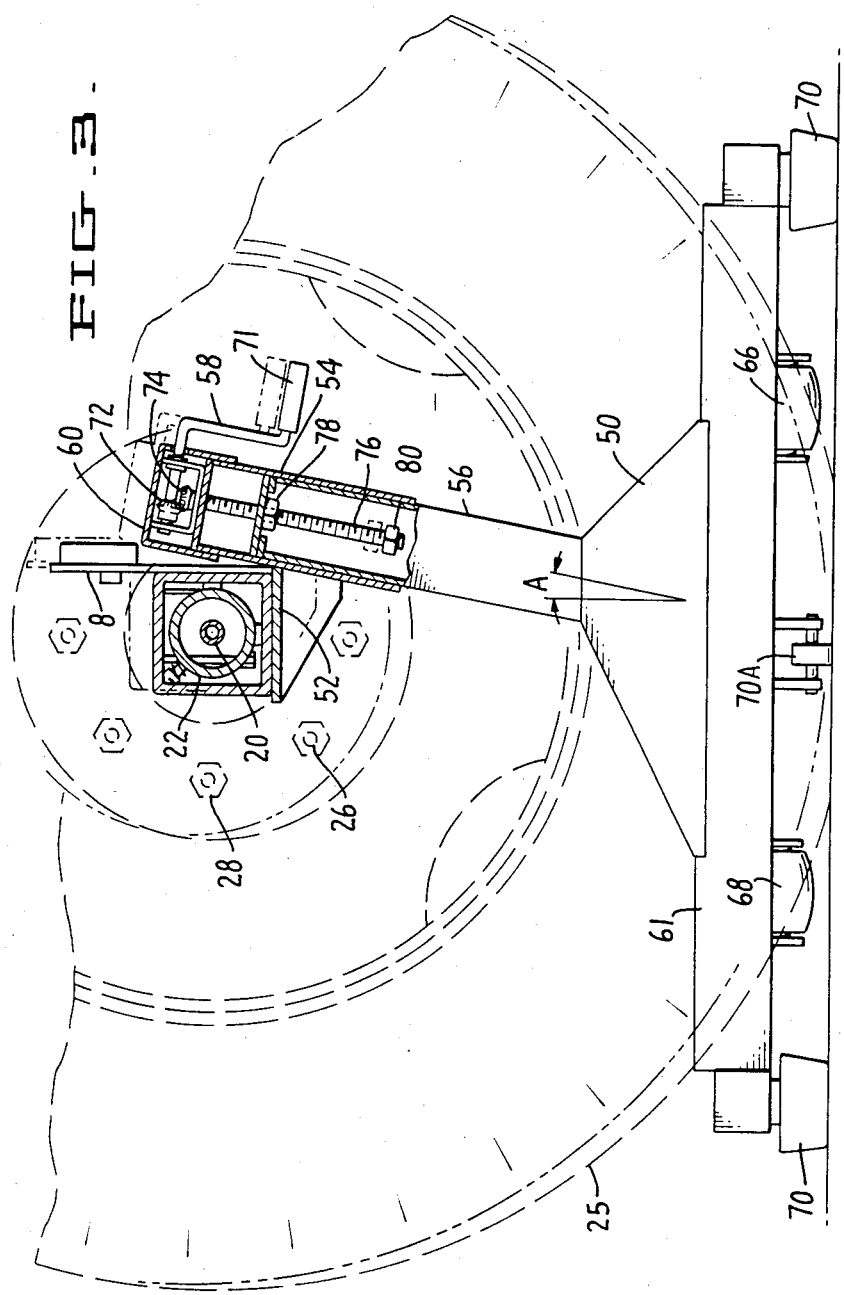
FIG. 3 is an elevational front view of a balancing apparatus such as is depicted in FIG. 2.

A balancing shaft 20 is suitably journalled for rotation in the housing 12 by means of bearings 22. A mounting flange or plate 24 is attached to one end of the shaft 20 and provides a suitable support surface against which a wheel 25 to be balanced abuts when mounted on the shaft 20. A frustoconical hub mechanism can be threaded onto the shaft 20 to lock the wheel to be balanced in place, or alternatively as illustrated in FIGS. 2 and 3 the wheel can be bolted to the plate 24 with conventional wheel bolts and lug nuts.

A timing disc 30 is mounted on the end of the shaft 20 opposite the mounting plate 24. The disc 30 has a number of radial slots or markings located around its periphery that cooperate in a well known manner with an electro-optical encoder 32 to provide an electrical pulse signal related to the rotational position and speed of the disc 30, and hence the shaft 20.

Lateral forces generated by the shaft 20 during its rotation, which are caused by imbalance in a wheel being measured, are sensed by piezoelectric transducers 34 and 36 that project through one of the side walls of the frame 10 and engage the housing 12. The base of housing 12 can be provided with bosses 38 or 40 that project from the side thereof and insure that the housing engages only the transducer elements 34 and 36 and does not rest against any other part of the frame 10. The housing is biased both downwardly and laterally into engagement with the transducers by means of a pair of spring loaded pins 41 that are attached to the frame 10 and engage the housing 12.

As is well known in the art of dynamic tire balancing, the transducers for sensing the lateral movement of the rotational shaft due to the imbalance of the wheel should be positioned at two spaced locations along the length of the shaft, so as to essentially measure the pivoting of the shaft about a vertical axis through its center.

The timing-encoder 32 and the transducers 34 and 36 are mounted on a single printed circuit board 45 that also supports and appropriately interconnects all of the other electronic components such as potentiometers 46 for the wheel balancer. These electronic components include a suitable conventional circuit that correlates the output signals of the transducers with information related to their location relative to the inner and outer rims of the wheel to be balanced, as well as the rotational position of the wheel, and provides an indication of the measured imbalance of the wheel. The information can be indicated on suitable display devices 48 that are also mounted on the printed circuit board 45. Circuit board 45 contains the circuit which carries out imbalance measurement at a non-predetermined velocity which circuit will be further described with reference to FIGS. 4 and 5. The circuit board 44 can be mounted on the frame 10, or can be attached to an outer cover (not shown) for the balancer head.

Balancing shaft 20 additionally carries a crank 42 which is provided to rotate the shaft 20 and the wheel 25 to determine the imbalance of the wheel 25. The crank 41 preferably is designed to drive in one direction and free-wheel in the other so that when the wheel is turning it does not result in a dangerous turning of the crank. This can be effected, for example, by attaching a sleeve 43 mounted on the crank 42 to the balancing shaft 20 by means of a wrap spring 44 or any other suitable one-way clutch device.

The balancing head assembly 8 is mounted on a base 50 as shown in FIGS. 2 and 3. This base 50 is designed to permit head assembly 8 to be moved up and down and align the shaft 20 with the center of the wheel 25 and align the wheel bolts 26 with the corresponding bolt holes on the wheel 25 for attachment by the lug nuts 28.

This can be accomplished by attaching the head assembly 8 to a shelf 52 which is in turn, attached to carriage 54 which moves up and down a slanted upright 56. The position of carriage 54 should be set by a control which permits relatively fine adjustment, such as plus or minus a millimeter, so as to permit the precise alignment of the balancer head with the wheel lugs, etc. One means to effect the adjustment is by the use of a threaded shaft 76 driven through a nut plate 78 on the upright 56 by means of a crank-driven pair of miter gears. The crank 58 may be equipped with grip 71. The miter gears 72 and 74 are enclosed by gear cover 60. The bearings and structure by which the shaft carrying miter gear 72 is attached to carriage 54 are conventional and not discussed herein for brevity. When the driving miter gear 72 is turned it in turn drives gear 74 and rotates the threaded shaft 76 and causes the shaft to move up and down through its interaction with nut plate 78. A stop nut 80 is provided on the end of shaft 76. The upright 56 is attached to the crossmember 61 of an essentially "U" shaped structure made up of the crossmember 61 and arms 62 and 64. This "U" shaped stucture has wheels or rollers 66 and 68 which come into play when the balancer is tilted back onto them and which permit the balancer to be moved right up to the wheel. A skid 70 as shown in FIG. 2 or a rigid wheel 70A as shown in FIG. 3 is provided on the crossmember to facilitate final positioning of the balancer by the wheel while providing a firm base for the balancer during the balancing operation.

It will be noted that nut plate 58 merely rests on the top of upright 56 and that the opening in upright 56 is large enough to clear the nut of nut plate 58. Thus, the entire assembly of balancer head 8, with its associated table 52 and vertical positioning mechanism can be lifted off of upright 56 if desired for transport or storage. By this disassembly, the precise and more delicate balancer head can be separated from the heavy and more durable base.

It will also be noted that preferably upright 56 is not perpendicular to crossmember 61 when viewed along shaft 20. The angle from perpendicular, angle "A", is shown at 10° but could be in the range of from about 3° to about 20°, especially 5° to 15°. This angle provides that when a wheel is mounted on the shaft 20, its weight applies a twisting force which loads the shelf 52 and the carriage 54 against the upright 56 and loads upright 56 against the lower structure made up of the crossmember 61 and the arms 62 and 64. This loading, which is at a force greater than the forces of imbalance generated during the balancing operation, takes up any play or clearance in the base structure and minimizes the likelihood of interferring vibrations and harmonics within the balancer itself.

In operation, the wheel to be balanced is removed from the truck or stood in a vertical position. The balancer is positioned near the wheel. The operator adjusts the vertical position of the balancer head by turning crank 58 until the wheel lugs align with the corresponding holes in the wheel. The balancer is then pushed forward until the wheel lugs 26 engage the wheel holes, and wheel nuts 28 are applied to hold the wheel. The precise method for mounting the wheel on shaft 20 is not central to the practice of this invention. Instead of wheel bolts 26 and lug nuts 28, a bolt plate and associated bolts could be used. Similarly, with a wheel having an accurately defined center hole it can be mounted using a center-hole-engaging cone system as is known in the art. Once the wheel is mounted the crank 58 is then turned to raise the wheel up until its tire clears the ground and the wheel becomes freely rotatable.

The operator enters information related to the spacing of the transducers from the inner rim of the wheel being measured (i.e., transducer offset), as well as the spacing between the inner and outer rims of the wheel and the wheel's diameter. Typically, this information can be empirically determined based upon standard wheel sizes and the mechanism for entering such information, for example potentiometers 46 (FIG. 1), can be calibrated in accordance with standard wheel sizes. Once the appropriate information has been entered, the wheel is set in motion by manually grasping the wheel or crank 42 and imparting a rotational force thereto.

When the wheel has been spun up to a velocity greater than a required minimum velocity a signal is given to the operator to indicate that no further rotational force need be applied. This velocity need not be greater than, and is preferably substantially less than, 180 revolutions per minute. The balancer measures imbalance forces and signals the operator that this has been completed. The wheel is then slowed such as by lowering the wheel until its tire drags on the ground. Once stopped, it is raised again and the weights needed to balance and their locations are displayed on display 48 and the weights can be applied to the wheel to bring it into balance.

In accordance with a further aspect of the invention, the measuring circuit preferably enables the imbalance measurement to be carried out at any given speed within a relatively wide range of rotational speeds. A circuit of this type finds particular usefulness in dynamic balancers of the type wherein the rotation is manually imparted to the wheel, and thus could vary widely in speed in dependence upon the force exerted by the operator. This variation in rotational speed from one measurement to the next is particularly prevalent in balancers that are adapted to accommodate a large variety of sizes of tires, such as that described with respect to FIGS. 2 and 3.

Figure 4:
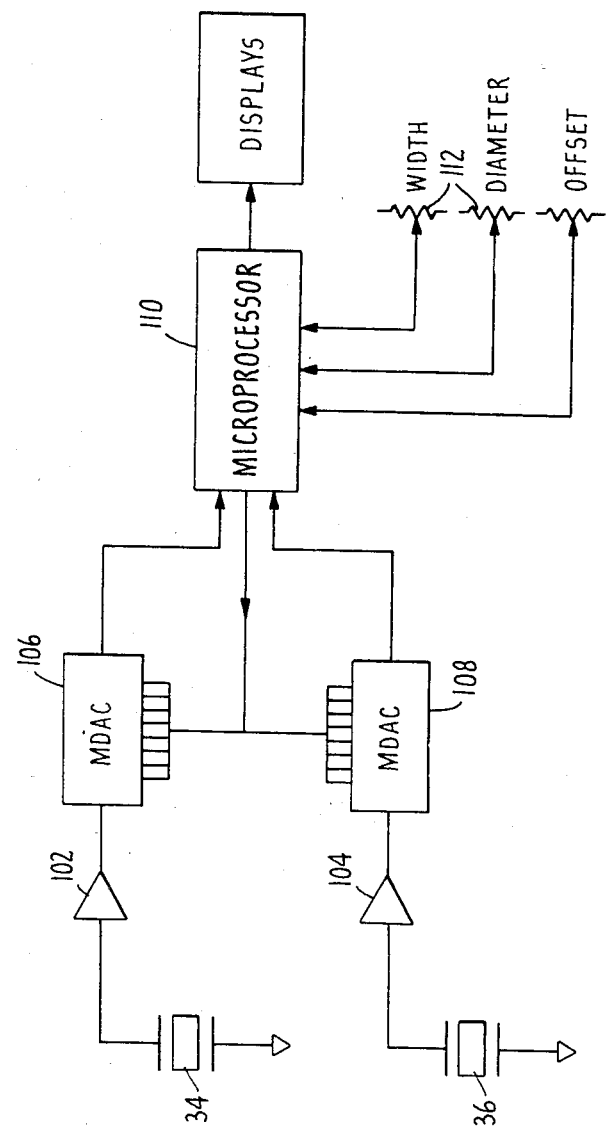
FIG. 4 is a schematic block diagram of the electrical circuit portion of a wheel balancer which does not employ a predetermined measuring velocity.

Referring to FIG. 4, in a circuit implementing this principle, the output signals from the piezoelectric transducers 34 and 36 are respectively amplified in amplifieres 102 and 104. The amplified output signals from these amplifiers are fed to a pair of multiplying digital-to-analog converters (MDAC's) 106 and 108. In operation, the MDAC's multiply each analog input signal by a factor determined by a digital signal, and then is fed this multiplied signal to a microprocessor 110. In the microprocessor, the analog input signals are converted to a digital format by an internal converter.

The MDAC's are initially set (prior to the time the initial measurements are made) to multiply the signal by a factor that is determined in accordance with the values of the wheel spread and also by the wheel diameter. The wheel diameter value is fed into the microprocessor by manually adjusted potentiometer 112. The wheel speed is measured. This factor can be empirically determined for different wheel types so as to result in a signal multiplication that is most likely to bring the amplitude of the adjusted input signal to the center of the microprocessor's operating range.

When the input signal is so large that it lies outside the microprocessor's operating range, the MDAC's are instructed to decrease the transducer input signal, i.e., multiply it by a factor less than one. If desired, the MDAC's can also be used to increase the amplitude of low level signals that may be produced by slow rotational speeds, for example. Once the input signal has been appropriately adjusted, the microprocessor acts upon it in a conventional manner to determine the state of imbalance of the wheel. By limiting the operating range within which the microprocessor must work, more accurate results are achieved with less expense. For example, a less expensive microprocessor having a smaller (e.g., 8-bit) internal A/D converter can be employed in place of one having a larger converter for accommodating wider ranges.

The comparison of the input signal to the threshold values and appropriate adjustment of its level can generally be carried out in about 3–5 revolutions of the wheel. Thus, it is feasible to perform this operation with each wheel measurement without losing any significant amount of time, particularly when contrasted with the time it takes a large wheel to slow down to a fixed measuring speed if it is initially spun too hard. Accordingly, a wheel balancer having this circuit can be efficiently used to balance a large variety of tires of different sizes, each of which might be spun at a different speed.

In more detail, the output signals from the transducers 34 and 36, after passing through an amplification stage 102 and 104, and through suitable filtering states, are presented to a two-channel MDAC 106/108. The MDAC separately multiplies each of these two input signals in accordance with the 8-bit command signal received from the microprocessor 110 over a data bus, and produces two adjusted output signals. These output signals, after suitable preamplification and processing in buffer stages, are presented to the microprocessor.

After the input signals have been adjusted to the proper level within the operating range of the microprocessor, the microprocessor utilizes them, in conjunction with the signals from the encoder 32 that indicate the angular position of the wheel and its direction of rotation, to determine the state of imbalance of the wheel in accordance with conventional algorithms. These algorithms, along with appropriate constants and calibration values, are stored in memory circuits that are addressed by control signals sent from the microprocessor over the data bus. Once the imbalance has been measured, the microprocessor controls suitable drivers to actuate display units to provide an indication of the amount of weight that must be added to the wheel to balance it. The microprocessor also controls the actuation of various LED's to guide the operator in rotating the wheel so that the weight is placed in the proper location. In addition to these LED's, the microprocessor can actuate a buzzer or other suitable audible or visual indicator to signal when the wheel has reached a sufficient rotational speed to enable a measurement to be carried out.

It will be appreciated by those of ordinary skill in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. A method for determining dynamically the imbalance of a wheel, comprising the steps of
   standing the wheel on the ground in a generally vertical position;
   vertically aligning a horizontal rotatable shaft coupled to means for measuring dynamically forces transmitted thereby with the center of the wheel and positioning the shaft in engagement with the wheel;
   mounting the wheel on the horizontal rotatable shaft;
   raising the horizontal rotatable shaft and the coupled means for measuring on a carriage mounted on an upright until the wheel clears the ground;
   preloading the carriage against the upright with a force which exceeds the maximum forces of imbalance generated by rotating the wheel and shaft during the dynamic imbalance determination;
   imparting rotation to the wheel and the shaft to a velocity great enough to render measurable forces of imbalance transmitted by the shaft;
   measuring dynamically forces of imbalance transmitted by the shaft in the absence of motion of the carriage prevented by the preloading;
   determining imbalance data related to the measured forces; and
   displaying the imbalance data.

2. The method of claim 1 wherein the imparting rotation is effected manually and the velocity achieved is a velocity no greater than 180 rpm.

3. The method of claim 2 wherein the wheel and shaft are allowed to coast and slow down.

4. The method of claim 1 comprising the additional step of
   after measuring dynamically the force of imbalance, lowering the horizontal shaft until the wheel contacts the ground thereby halting the wheel's rotation.

5. In a machine for determining dynamically the imbalance of a wheel which includes a horizontal rotatable shaft adapted to support a wheel to be balanced, coupled to means for measuring dynamically forces of imbalances transmitted by said shaft when the wheel rotates and means for determining and displaying dynamic imbalance data related to the measured forces, the improvement comprising providing a carriage mounted on an upright for adjusting the vertical position of said horizontal shaft to align said shaft with the center of the wheel in a vertically standing position and means for raising said horizontal shaft supporting the wheel together with the coupled means for measuring forces of imbalance with the carriage to a height that permits the wheel to clear the ground and providing preloading of the carriage against the upright with a force which exceeds the maximum forces of imbalance generated by rotating the wheel and shaft in the dynamic imbalance measuring process.

6. The wheel imbalance determining machine of claim 5 wherein the machine is horizontally movable to the vertically standing wheel on wheels which engage the ground when the machine is tilted from its position for determining imbalance but which do not engage the ground when the machine is in position for determining imbalance thereby providing a firm base for determining imbalance.

7. The wheel imbalance determining machine of claim 6 wherein said machine is mobile and the rotatable shaft, means for measuring forces of imbalance and means for determining and displaying imbalance data are in a balance head unit which is separably mounted on the carriage on a base that permits the machine to be horizontally movable.

8. The wheel imbalance determining machine of claim 5 additionally comprising means for lowering said horizontal shaft supporting the wheel while the wheel is rotating to a level that permits the rotating wheel to contact the ground and halt its rotation.

9. The wheel imbalance determining machine of claim 6 wherein the machine additionally comprises skids upon which it is supported when in its position for determining imbalance.

10. The wheel imbalance determining machine of claim 6 wherein the machine additionally comprises skids and a rigid wheel upon which it is supported when in its position for determining imbalance.

11. In a machine for determining the imbalance of a wheel which includes a horizontal rotatable shaft adapted to support a wheel to be balanced, coupled to means for measuring forces of imbalance transmitted by said shaft when the wheel rotates and means for determining and displaying imbalance data related to the measured forces, the improvement comprising providing means for adjusting the vertical position of said horizontal shaft to align said shaft with the center of the wheel in a vertically standing position and means for raising said horizontal shaft supporting the wheel to a height that permits the wheel to clear the ground and wherein the means for adjusting the vertical position of the horizontal shaft and raising the horizontal shaft include a carriage for said shaft moving up and down an upright which is parallel to the face plane of the vertically standing wheel and angled from a vertical plane through the horizontal shaft to thereby self-lock and preload carriage against the upright with the weight of the wheel.

12. The wheel imbalance determining machine of claim 11 wherein said upright is parallel to the face plane of the vertically standing wheel and angled from 3° to 20° from a vertical plane through the horizontal shaft to lock by weight.

13. The wheel imbalance determining machine of claim 12 wherein said upright is angled at about 10° from said vertical plane.

* * * * *